(12) United States Patent
Yoshino et al.

(10) Patent No.: US 8,052,888 B2
(45) Date of Patent: Nov. 8, 2011

(54) POLYMERIC ELECTROLYTE, METHOD FOR PRODUCTION THEREOF, AND ELECTROCHEMICAL ELEMENT

(75) Inventors: Akira Yoshino, Tokyo (JP); Hitoshi Shobukawa, Tokyo (JP)

(73) Assignee: Asahi Kasei Kabushiki Kaisha, Osaka-Shi, Osaka (JP)

( * ) Notice: Subject to any disclaimer, the term of this patent is extended or adjusted under 35 U.S.C. 154(b) by 580 days.

(21) Appl. No.: 12/224,900

(22) PCT Filed: Sep. 10, 2007

(86) PCT No.: PCT/JP2007/067598
§ 371 (c)(1),
(2), (4) Date: Sep. 9, 2008

(87) PCT Pub. No.: WO2008/032679
PCT Pub. Date: Mar. 20, 2008

(65) Prior Publication Data
US 2009/0065730 A1    Mar. 12, 2009

(30) Foreign Application Priority Data

Sep. 11, 2006 (JP) ................. 2006-245320
Sep. 11, 2006 (JP) ................. 2006-245321
Sep. 11, 2006 (JP) ................. 2006-245322

(51) Int. Cl.
H01B 1/06      (2006.01)
H01B 13/00     (2006.01)
H01G 9/038     (2006.01)
H01M 6/18      (2006.01)
H01M 10/36     (2010.01)
H01M 14/00     (2006.01)

(52) U.S. Cl. ....... 252/62.2; 429/303; 429/317; 361/526; 361/525

(58) Field of Classification Search ............ 252/62.2; 429/303, 317; 361/526, 525
See application file for complete search history.

(56) References Cited

U.S. PATENT DOCUMENTS

| 4,024,325 | A  | * | 5/1977  | Hudgin .................. 528/392 |
| 4,303,748 | A  |   | 12/1981 | Armand et al. |
| 4,613,533 | A  |   | 9/1986  | Loomis et al. |
| 5,110,669 | A  | * | 5/1992  | Knobel et al. ............ 428/215 |
| 6,268,088 | B1 | * | 7/2001  | Oh et al. .................. 429/303 |
| 2006/0204854 | A1 |   | 9/2006  | Fujimoto et al. |

FOREIGN PATENT DOCUMENTS

| JP | 50-34087    |   | 4/1975  |
| JP | 53-128690   |   | 11/1978 |
| JP | 54-104541   | A | 8/1979  |
| JP | 55-98480    | A | 7/1980  |
| JP | 57-143356   | A | 9/1982  |
| JP | 58-75779    | A | 5/1983  |
| JP | 59-230058   | A | 12/1984 |
| JP | 60-31555    | A | 2/1985  |
| JP | 60-248724   | A | 12/1985 |
| JP | 61-254626   | A | 11/1986 |
| JP | 62-30147    | A | 2/1987  |
| JP | 1-92222     | A | 4/1989  |
| JP | 1-197974    | A | 8/1989  |
| JP | 1-241767    | A | 9/1989  |
| JP | 1-284508    | A | 11/1989 |
| JP | 10-324719   | A | 12/1998 |
| JP | 11-60870    | A | 3/1999  |
| JP | 2001-26661  | A | 1/2001  |
| JP | 2002-198095 | A | 7/2002  |
| JP | 2004-111639 | A | 4/2004  |
| JP | 2004-123872 | A | 4/2004  |

OTHER PUBLICATIONS

P.V. Wright, Complexes of alkali metal ions with poly(ethylene oxide) Polymer, vol. 14, p. 589 (1973).
European search report issued on Oct. 6, 2010 in corresponding European Patent Application No. 07 80 7008.

* cited by examiner

*Primary Examiner* — Carol M Koslow
(74) *Attorney, Agent, or Firm* — Birch, Stewart, Kolasch & Birch, LLP

(57) ABSTRACT

A polymeric electrolyte comprising: a polymeric material and an electrolyte salt; or a polymeric material, a solvent and an electrolyte salt, wherein a copolymer composed of 50 to 99 mol % of an ethylenically unsaturated compound and 1 to 50 mol % of carbon monoxide comprises 66.7 to 100 wt % of the polymeric material.

18 Claims, 1 Drawing Sheet

POLYMERIC ELECTROLYTE, METHOD FOR PRODUCTION THEREOF, AND ELECTROCHEMICAL ELEMENT

TECHNICAL FIELD

The present invention relates to a polymer electrolyte with high ionic conductivity comprising a copolymer of an ethylenically unsaturated compound and carbon monoxide, and a process for producing the same. The present invention further relates to an electrochemical device using the polymer electrolyte which has excellent liquid leakage resistance, heat resistance, and safe performance.

Hereinafter, the copolymer of an ethylenically unsaturated compound and carbon monoxide includes examples of an alternative copolymer as well, and both are also collectively represented as an (alternative) copolymer depending on the context of explanation.

BACKGROUND ART

As portable information devices such as a laptop computer and a cellular phone have become popular, a demand for electrochemical devices such as a primary battery, a secondary battery and an electric double layer capacitor used as power supplies for the devices has rapidly increased. It is particularly required for these electrochemical devices to be compact and light, and from into a thin film, and simultaneously improvement of reliability is also expected. In recent years, in addition to power supplies for portable information devices new applications such as power supplies for a hybrid electric car and energy storage have been developed, and thus have been required to further improve the reliability.

An electrolyte solution in which an electrolyte salt is dissolved in a solvent is generally used in an electrochemical device, and when leakage liquid and further an electrolyte solution are non-aqueous electrolyte solutions, troubles such as catching fire and setting fire are caused, which make a major factor in impairing the reliability. Accordingly, these problems can be solved by using a solid electrolyte in place of an electrolyte solution. Particularly, a polymer electrolyte is easy to form a thin film and has excellent mechanical properties and flexibility, and therefore is a highly promising material.

From such viewpoints, many investigations with respect to a polymer electrolyte have been made over the years and there have been many proposals since it was firstly reported that ionic conductivity was produced by composite formation of a certain kind of alkali metal salt with a poly(ethylene oxide)-based high polymer (see Non-Patent Document 1).

Patent Document 1 proposes semi-solid gel-type polymer electrolytes comprising methyl polymethacrylate, electrolyte salts such as $LiClO_4$ or $LiBF_4$, and organic solvent.

Patent Document 2 proposes an electrochemical generator using an all solid-type polymer electrolyte in which an electrolyte salt is solid-solubilized in a high polymer containing a heteroatom such as oxygen or nitrogen, and poly(ethylene oxide) and a polyamine, are shown as examples of a polymer material in the document.

Patent Document 3 proposes a gel-type polymer electrolyte composition in which an electrolyte salt is dissolved in a mixture of a high polymer having a dielectric constant of 4 or more and an organic solvent having a dielectric constant of 10 or more, and shows that examples of a polymer material satisfying such a requirement include nitrocellulose, a phenol resin, polyvinylidene fluoride, polyacrylonitrile and chlorosulfonated polyethylene.

Patent Document 4 discloses a lithium solid electrolyte cell using metal lithium as a negative electrode and metal chalcogenide as a positive electrode, and shows that examples of the solid electrolyte include polymer electrolytes using a vinylidene fluoride copolymer, polyvinyl chloride, polyvinyl acetate, polyvinyl pyrrolidone or the like.

Patent Document 5 proposes an ionic conductive solid composition using a polymer material and discloses polysiloxane as an excellent polymer material.

Patent Document 6 discloses a hybrid ion conductor using an oxyethylene (meth)acrylate polymer.

Further, Patent Document 7 discloses an ionic conductive crosslinking-type resin composition based on an aliphatic epoxy resin, Patent Document 8 discloses a polymer electrolyte based on polyphosphazene, Patent Document 9 discloses an ionic conductive polymer complex comprising polyalkylene carbonate, metal salts and organic solvent, Patent Document 10 discloses a polymer solid electrolyte and a polymer solid electrolyte cell using polyurethane, and Patent Document 11 discloses, for example, an ionic conductive composition based on polyvinyl alcohol.

As described above, with respect to a polymer electrolyte, two kinds of polymer materials of an all solid-type polymer electrolyte comprising a polymer material and an electrolyte salt and a gel-type polymer electrolyte mixed with a polymer material and an electrolyte salt, and further a solvent have been proposed, but the following significant problem still remains.

That is, no material achieving practically satisfying ionic conductivity was proposed for an all solid-type polymer electrolyte. Further, a large amount of solvent had to be mixed to obtain practical ionic conductivity in the case of a gel-type polymer electrolyte. Therefore, from the viewpoint of reliability, reliability of each of these electrolytes is only a level better than that of an electrochemical device using a conventional liquid electrolyte, and thus high reliability originally expected for a polymer electrolyte was not achieved.

Thereafter, keeping in line with commercialization of a lithium ion secondary battery, it was proposed to apply a polymer electrolyte to a lithium ion secondary battery (see Patent Document 12). Thereby, research of a polymer electrolyte has been actively conducted and a lithium ion secondary battery using a gel-type polymer electrolyte was commercialized. However, as described above, this gel-type polymer electrolyte contained a large amount of solvent, and high reliability originally expected for a polymer electrolyte was not obtained. As a result, in a lithium ion secondary battery market, most of the product is occupied by the one using a liquid electrolyte and the market share of a lithium ion secondary battery using a gel-type polymer electrolyte is extremely small. In order to solve this problem, various polymer materials have been investigated since then, and Patent Document 13 proposes an ionic conductive polymer electrolyte comprising a polymer A having a carbonyl group (1 to 40% by weight), a poly(vinylidene fluoride)-based polymer B (20 to 70% by weight), a metal salt C (1 to 50% by weight) and an organic solvent D (20 to 85% by weight). Herein, preferable examples of the polymer A having a carbonyl group include polyesters, polycarbonates and polyester carbonates, and the other examples thereof further include polyamides, polypeptides, polyurethanes and polyketones. However, this system also contains a large amount of organic solvent, and the ionic conductivity is not always satisfying.

As described above, although a lithium ion secondary battery using a gel-type polymer electrolyte is put into practical use for only partial application of compact consumer batteries, major problems still remain in development of a polymer electrolyte in the present situation.

Patent Document 1: JP-A-54-104541
Patent Document 2: JP-A-55-098480
Patent Document 3: JP-A-57-143356
Patent Document 4: JP-A-58-075779
Patent Document 5: JP-A-59-230058
Patent Document 6: JP-A-60-031555
Patent Document 7: JP-A-60-248724
Patent Document 8: JP-A-61-254626
Patent Document 9: JP-A-62-030147
Patent Document 10: JP-A-01-197974
Patent Document 11: JP-A-01-284508
Patent Document 12: JP-A-01-241767
Patent Document 13: JP-A-11-060870
Non-Patent Document 1: P. V. Wright, Polymer, 14, 589 (1973)

DISCLOSURE OF THE INVENTION

Problems to be Solved by the Invention

As described above, it was difficult to satisfy both the ionic conductivity and reliability in a conventional polymer electrolyte. Particularly in recent years, the field of large-scale application such as a hybrid electric car requiring higher reliability has been developed, and the requirement of intrinsic reliability which a polymer electrolyte should originally have has been increased more than ever. Further, a polymer electrolyte is usually used at a high voltage of 100 V or more in this field of large-scale application, and a polymer electrolyte having high ionic conductivity and high reliability has been required for realizing a bipolar electrode that is the most rational electrode structure for use at such high voltages.

The present invention has been made to solve these problems and provides an all solid-type polymer electrolyte having high ionic conductivity by selecting a specific polymer material, a gel-type polymer electrolyte having high ionic conductivity by adding a small amount of a solvent within an extent not impairing reliability, and a process for producing these electrolytes. Further, the present invention also provides an electrochemical device having excellent output characteristics and high reliability by using these polymer electrolytes.

Means for Solving the Problems

The present inventors have made intensive studies in order to solve the above-mentioned problems. As a result, we have found that the above-mentioned problems can be solved by using an (alternative) copolymer of an ethylenically unsaturated compound and carbon monoxide, leading to the present invention.

A polymer electrolyte of the present invention is a polymer electrolyte comprising a polymer material and an electrolyte salt, or a polymer material, a solvent and an electrolyte salt, characterized in that 66.7% by weight to 100% by weight of the polymer material is a copolymer of 50 to 99 mol % of an ethylenically unsaturated compound and 1 to 50 mol % of carbon monoxide.

Further, the polymer electrolyte of the present invention is a polymer electrolyte comprising a polymer material and an electrolyte salt, or a polymer material, a solvent and an electrolyte salt, characterized in that 100% by weight of the polymer material is a copolymer of 50 to 99 mol % of an ethylenically unsaturated compound and 1 to 50 mol % of carbon monoxide, and a weight ratio of the solvent to a total of the solvent and the polymer material is 0 or more and less than 33.3%.

Further, the polymer electrolyte of the present invention is characterized in that the copolymer comprises an alternative copolymer of an ethylenically unsaturated compound and carbon monoxide.

Further, a process for producing the polymer electrolyte of the present invention is characterized by comprising the steps of: dissolving a polymer material comprising 66.7% by weight to 100% by weight of a copolymer of 50 to 99 mol % of an ethylenically unsaturated compound and 1 to 50 mol % of carbon monoxide in a solution in which 30% by weight to 90% by weight of an electrolyte salt is dissolved in a solvent; forming the resulting mixture into an arbitrary shape; and removing a part or all of the solvent.

Further, the process for producing the polymer electrolyte of the present invention is characterized by comprising the steps of: dissolving a copolymer of 50 to 99 mol % of an ethylenically unsaturated compound and 1 to 50 mol % of carbon monoxide in a solution in which 30% by weight to 90% by weight of an electrolyte salt is dissolved in a solvent; forming the resulting mixture into an arbitrary shape; and removing a part or all of the solvent.

Further, the process for producing the polymer electrolyte of the present invention is characterized by comprising the steps of: dissolving an alternative copolymer of an ethylenically unsaturated compound and carbon monoxide in a solution in which 30% by weight to 90% by weight of an electrolyte salt is dissolved in a solvent; forming the resulting mixture into an arbitrary shape; and removing a part or all of the solvent.

Further, an electrochemical device of the present invention is characterized by using the above-mentioned polymer electrolyte of the present invention.

EFFECTS OF THE INVENTION

The polymer electrolyte of the present invention will achieve an effect satisfying both high ionic conductivity and reliability. In addition, the electrochemical device of the present invention will achieve an effect having high reliability and excellent output characteristics.

BEST MODE FOR CARRYING OUT THE INVENTION

Hereinafter, the present invention will be specifically described.

One of the characteristics of the present invention is that an (alternative) copolymer of an ethylenically unsaturated compound and carbon monoxide is used as a polymer electrolyte.

A copolymer of an ethylenically unsaturated compound such as ethylene and propylene, and carbon monoxide has photosensitivity based on a carbonyl group contained in a main chain of the polymer, and attention has been paid to this copolymer as a photosensitive polymer material and an easily photodisintegrated polymer material for long time. It is known as the manufacturing method that the copolymer is obtained by thermal polymerization or radical polymerization of an ethylenically unsaturated compound and carbon monoxide in the presence of an initiator such as peroxides, as disclosed in, for example, JP-A-50-34087 and JP-A-53-128690.

The present invention is based on the finding that the polymer electrolyte having high ionic conductivity can be obtained by using this copolymer of an ethylenically unsaturated compound and carbon monoxide.

However, the copolymer obtained in the above-mentioned radical polymerization was a random copolymer having a low carbon monoxide content.

Meanwhile, there has been recently found a method copolymerizing an ethylenically unsaturated compound with carbon monoxide are copolymerized by coordination polymerization using a transition metal compound, such as palladium as a catalyst, as disclosed in, for example, JP-A-01-092222. An alternative copolymer in which an ethylenically unsaturated compound and carbon monoxide are alternatively copolymerized can be obtained by this coordination polymerization.

The present invention is also based on the finding that a polymer electrolyte having high ionic conductivity can be obtained by using an alternative copolymer of an ethylenically unsaturated compound and carbon monoxide.

Examples of the ethylenically unsaturated compound used in the present invention include α-olefins such as ethylene, propylene, 1-butene, 1-hexene, 1-octene and 1-decene; alkenyl aromatic compounds such as styrene, α-methylstyrene and p-methylstyrene; cyclic olefins such as cyclopentene, norbornene and 5-methylnorbornene; vinyl halides such as vinyl chloride; and acrylic acid esters such as ethyl acrylate and methyl methacrylate.

Among these, a preferable ethylenically unsaturated compound is α-olefins, and a more preferable ethylenically unsaturated compound is α-olefins having 2 to 4 carbon atoms.

These ethylenically unsaturated compounds can be used singly or as a mixture of a plurality thereof. When a plurality of the compounds are used for the alternative copolymer, any one of ethylenically unsaturated compounds may be alternatively copolymerized with carbon monoxide.

As a polymerization method for a copolymer that is not an alternative copolymer, polymerization by a thermal polymerization initiator as described above is possible, and examples of the initiator include peroxides such as benzoyl peroxide, lauroyl peroxide, di-t-butyl peroxide, dicumyl peroxide and t-butyl hydroperoxide; and azo compounds such as azobisisobutyronitrile and azobisvaleronitrile. As a polymerization form, bulk polymerization, solution polymerization, slurry polymerization and the like can be selected.

As a coordination polymerization catalyst for producing an alternative copolymer, a combination of three components of a transition metal compound, particularly a palladium compound, a compound acting as a ligand of palladium and an anion is preferred. As the palladium compound, carboxylates, phosphates, carbamates, sulfonates, halides of palladium or the like are used, and specific examples thereof include palladium acetate, palladium butyrate, palladium trifluoroacetate, palladium phosphate, palladium acetylacetonate, palladium trifluoromethanesulfonate, palladium chloride, and bis(N,N-diethylcarbamate)bis(diethylamino)palladium.

Examples of the compound acting as a ligand of palladium include amine-based compounds and phosphine-based compounds. Further, examples of the anion include an anion of an inorganic acid such as sulfuric acid, nitric acid, perchloric acid or phosphoric acid; and an anion of an organic acid such as trifluoroacetate, methanesulfonic acid and trifluoromethanesulfonic acid.

Generally, an ethylenically unsaturated compound and carbon monoxide are copolymerized in the presence of a solvent in which said catalyst is dissolved or dispersed. Examples of the solvent for polymerization include water, methanol, ethanol, propanol, acetone, methyl ethyl ketone, diethyl ether, tetrahydrofuran, ethyl acetate and acetonitrile.

Polymerization temperature is usually in a range of 20° C. to 200° C., and preferably 70° C. to 150° C. An (alternative) copolymer of an ethylenically unsaturated compound and carbon monoxide used in the present invention can be obtained by polymerization under a pressure of $1.013 \times 10^5$ Pa to $2.026 \times 10^7$ Pa (1 atm to 200 atm), if necessary.

It can be easily confirmed by a spectroscopic analysis method of $^{13}$C-NMR or the like whether a repeating unit derived from an ethylenically unsaturated compound and a repeating unit derived from carbon monoxide are substantially alternatively arranged in this polymer.

A copolymerization ratio can be controlled, for example, by a charge ratio of an ethylenically unsaturated compound to carbon monoxide, and a copolymer in which the molar ratio of carbon monoxide is in a range of 1 to 50% can be usually obtained. In order to obtain higher ionic conductivity, the molar ratio of carbon monoxide is preferably 5 to 50% and more preferably 10 to 50%.

A weight average molecular weight of an (alternative) copolymer of an ethylenically unsaturated compound and carbon monoxide is preferably 5,000 to 1,000,000, and more preferably 10,000 to 1,000,000.

The (alternative) copolymer of an ethylenically unsaturated compound and carbon monoxide of the present invention may be used singly, but a polymer electrolyte may be produced by mixing other polymer materials. When other polymer materials are mixed for use, 66.7 to 100% by weight of the (alternative) copolymer in the total weight of the polymer materials is preferred, because the resulting polymer electrolyte has high ionic conductivity. By using the alternative copolymer mixed with other polymer materials within a scope of the present invention, function effects such as improvements of mechanical strength, flexibility, moldability and chemical resistance can be obtained without impairing ionic conductivity.

Polymer materials to be mixed may be appropriately selected, according to the purpose, from the groups of polymer materials such as vinyl polymerization-, ring-opening polymerization-, condensation polymerization-, addition polymerization- and addition condensation-materials. Examples thereof include the following polymer materials; polyolefin-based polymers and copolymers such as polyethylene, polypropylene and poly 4-methylpentene; polyalkadiene-based polymers and copolymers such as polybutadiene and polyisoprene; polyalkenyl-based polymers and copolymers such as polystyrene and poly α-methylstyrene; vinyl ester-based polymers and copolymers such as polyvinyl acetate and polyvinyl butyrate; vinyl ether-based polymers and copolymers such as poly(methyl vinyl ether) and poly (ethyl vinyl ether); (meth)acrylate-based polymers and copolymers such as polymethyl methacrylate and polybutyl acrylate; nitrile-based polymers and copolymers such as polyacrylonitrile and polymethacrylonitrile; nitrogen-containing vinyl-based polymers and copolymers such as polyvinyl pyridine, polyvinyl imidazole, poly N-methylvinyl pyrrolidone and polyacrylamide; fluorine-containing vinyl- and vinylidene-based polymers and copolymers such as polyvinyl fluoride and polyvinylidene fluoride; polyether-based polymers and copolymers such as polyethylene oxide and polypropylene oxide; polyimine-based polymers and copolymers such as polyethylene imine and polypropylene imine; polythio ether-based polymers and copolymers such as polyethylene sulfide; polyamide-based polymers and copolymers such as nylon 6 and nylon 66; polyester-based ring-opening polymerization type and other polyurethane-based polymers and copolymers such as polyethylene terephthalate and polylactic acid; and polycarbonate-based polymers and copolymers.

Preferable examples of an electrolyte salt used as the polymer electrolyte of the present invention include inorganic salts such as $LiClO_4$, $LiBF_4$, $LiPF_6$, LiBr, LiI, LiSCN and $LiAsF_6$; organic sulfonates such as $CH_3SO_3Li$ and $CF_3SO_3Li$; and sulfonyl imide salts such as $(CF_3SO_2)_2NLi$, $(CF_3CF_2SO_2)_2NLi$ and $(CF_3SO_2)(CF_3CF_2SO_2)NLi$.

As a cation species of the above-mentioned electrolyte salt, alkali metal salts other than a Li salt, for example, salts of alkali metals such as sodium and potassium can also be used. In addition, cation species such as an aliphatic quaternary ammonium salt, an imidazolium salt, a pyridinium salt and a piperidinium salt can also be used.

The amount of the electrolyte salt is in a range of preferably 1 to 90% by weight, and more preferably 5 to 75% by weight based on the total of said polymer material and said electrolyte salt.

A polymer electrolyte can be obtained by complexing the above-mentioned polymer material and electrolyte salt, and there have been conventionally known, for example, the following complexation methods.

1. A method for obtaining a polymer electrolyte by dissolving a polymer material and an electrolyte salt in a solvent in which both of them can be dissolved, and then removing a part or all of the solvent (Method 1)
2. A method for obtaining a polymer electrolyte by firstly forming a polymer material into a shape such as a film form, and then impregnating and swelling it with a solution in which an electrolyte salt is dissolved in a solvent, and removing a part or all of the solvent (Method 2)
3. A method for obtaining a polymer electrolyte by melting and kneading a polymer material and an electrolyte salt (Method 3)
4. A method for obtaining a polymer electrolyte by dissolving an electrolyte salt in a liquid monomer or prepolymer, and then polymerizing them (Method 4)

As a method for complexation of a polymer material and an electrolyte salt in the present invention, among the above-mentioned methods, Methods 1 to 3 are preferred. A complexation method will be described below.

A solvent used for complexation by Method 1 is water and/or a non-aqueous solvent, and examples of the non-aqueous solvent include cyclic carbonates such as propylene carbonate, ethylene carbonate and vinylene carbonate; linear carbonates such as diethyl carbonate, dimethyl carbonate and ethyl methyl carbonate; cyclic esters such as γ-butyrolactone; linear esters such as ethyl acetate and methyl acetate; ketones such as acetone and methyl ethyl ketone; alcohols such as methanol and ethanol; ethers such as tetrahydrofuran, 1,4-dioxane and 1,2-dimethoxy ethane; nitriles such as acetonitrile and benzonitrile; amides such as dimethyl formamide, dimethyl acetoamide and N-methylpyrrolidone; and sulforanes.

Further, as a modified method of Method 1, a solution in which an electrolyte salt is dissolved in water or an organic solvent at a high concentration can be used, and this method is a particularly useful when the molar ratio of carbon monoxide within the polymer material used by the present invention is high. The concentration of an electrolyte salt in this case is appropriately selected, but preferably, the weight ratio of an electrolyte salt to the total weight of the electrolyte salt and a solvent is 30% by weight to 90% by weight, and more preferably, 50% by weight to 90% by weight from the viewpoint of good solubility.

A polymer electrolyte of the present invention can be obtained by forming the solution obtained by this method into an arbitrary shape such as a sheet by a method of coating, casting, extruding or the like, and removing a part or all of the solvent. In addition, an electrode for an electrochemical device using a polymer electrolyte of the present invention can be obtained by mixing a positive electrode active material or a negative electrode active material in this solution, forming the mixture into a sheet shape or the like in the same manner as described above, and then removing a part or all of the solvent.

The removal of a part or all of a solvent can be controlled by using, for example, a hot plate, an oven and a temperature-programmed oven in which a temperature program can be set. Although the drying condition is different depending on the type and the amount of the solvent to be removed a drying temperature condition of, for example, at 50 to 250° C. in about 30 minutes to 10 hours can be preferably used. In addition, the solvent may be dried under reduced pressure using a vacuum dryer.

The polymer electrolyte of the present invention may be used as the polymer electrolyte in the above-mentioned dried state, and may be used, if necessary, after performing a crosslinking reaction. As a crosslinking method, general methods such as electron beam crosslinking and chemical crosslinking by ammonia, a diamine, a radical generator and the like are used.

When complexation is performed by Method 2, the polymer electrolyte of the present invention can be obtained by impregnating and swelling the solution in which electrolyte salts are dissolved in a solvent into the polymer material of the present invention previously formed into a shape such as a film, and removing a part or all of the solvent. The same solvent as used in Method 1 can be used also in Method 2. In addition, an electrode for an electrochemical device using the polymer electrolyte of the present invention can be obtained by previously kneading and mixing the polymer material of the present invention with a positive electrode active material or a negative electrode active material, forming the mixture into a shape such as a sheet, then impregnating and swelling it with the solution in which an electrolyte salt is dissolved in a solvent, and removing a part or all of the solvent.

When complexation is performed by Method 3, a polymer electrolyte can be directly obtained by melting and kneading the polymer material and the electrolyte salt of the present invention and forming the mixture into a shape such as a film. In addition, an electrode for an electrochemical device using the polymer electrolyte of the present invention can be directly obtained by melting and kneading a positive electrode active material or a negative electrode active material in addition to the polymer material and the electrolyte salt of the present invention, and forming the resulting mixture into a shape such as a film.

When a copolymer of an ethylenically unsaturated compound and carbon monoxide used in the present invention is an alternative copolymer, the copolymer has high crystallinity and thus has a high melting point and is also insoluble in most solvents. Therefore, complexation of the copolymer with an electrolyte salt was not easy according to the above-mentioned conventional methods.

The present inventors have invented a simple production method of a polymer electrolyte based on the fact that a solution containing an electrolyte salt dissolved in water or an organic solvent at a high concentration unexpectedly dissolves an alternative copolymer of an ethylenically unsaturated compound and carbon monoxide.

As one of the methods for obtaining the polymer electrolyte of the present invention, as referred to as a modified method of the Method 1, a method using a concentrated solution of an electrolyte salt will be described below.

An alternative copolymer of an ethylenically unsaturated compound and carbon monoxide is completely insoluble in water and a common non-aqueous solvent, but is exceptionally soluble in a solution in which the electrolyte salt is dissolved in either of water, a non-aqueous solvent or a mixture thereof at a high concentration.

The solvent used herein is water and/or a non-aqueous solvent, and preferable examples of the non-aqueous solvent include cyclic carbonates such as propylene carbonate, ethylene carbonate and vinylene carbonate; linear carbonates such as diethyl carbonate, dimethyl carbonate and ethyl methyl carbonate; cyclic esters such as γ-butyrolactone; linear esters such as ethyl acetate and methyl acetate; ketones such as acetone and methyl ethyl ketone; alcohols such as methanol and ethanol; ethers such as tetrahydrofuran, 1,4-dioxane and 1,2-dimethoxy ethane; nitrites such as acetonitrile and benzonitrile; amides such as dimethyl formamide, dimethyl acetoamide and N-methylpyrrolidone; and sulforanes.

The concentration of an electrolyte salt is appropriately selected, but preferably, the weight ratio of an electrolyte salt to the total weight of the electrolyte salt and a solvent is 30% by weight to 90% by weight, and more preferably, 50% by weight to 90% by weight from the viewpoint of good solubility.

An alternative copolymer of an ethylenically unsaturated compound and carbon monoxide can be dissolved in this concentrated solution by mixing and stirring. The temperature for dissolving the copolymer is appropriately selected and the polymer can be sufficiently dissolved even at room temperature, but the dissolving speed can be increased by heating. The heating temperature is, but not particularly limited to, in a range from room temperature to 250° C., preferably from 50° C. to 200° C., and more preferably from 80° C. to 150° C.

A uniform transparent solution can be obtained by this dissolving operation, and the polymer electrolyte of the present invention can be obtained by forming this solution into an arbitrary shape such as a sheet by a method of coating, casting, extruding or the like, and then removing a part or all of a solvent. In addition, an electrode for an electrochemical device using the polymer electrolyte of the present invention can be obtained by mixing a positive electrode active material or a negative electrode active material in this solution, forming the mixture into a sheet in the same manner as described above, and then removing a part or all of a solvent.

The removal of a part or all of a solvent can be controlled by using, for example, a hot plate, an oven and a temperature-programmed oven in which a temperature program can be set. Although the drying condition is different depending on the type and the amount of the solvent to be removed, for example, a drying temperature condition of 50 to 250° C. in about 30 minutes to 10 hours can be preferably used. In addition, the solvent may be dried under reduced pressure using a vacuum dryer.

The polymer electrolyte of the present invention may be used as a polymer electrolyte directly in the above-mentioned dried state, and may be used, if necessary, after performing a crosslinking reaction. As a crosslinking method, general methods such as electron beam crosslinking and chemical crosslinking by ammonia, a diamine, a radical generator and the like are used. The polymer electrolyte of the present invention also includes those crosslinked by said crosslinking methods.

The first embodiment of the polymer electrolyte of the present invention includes, for example, an all solid-type polymer electrolyte. That is, when all of a solvent is removed by the Method 1 (including a method using a concentrated solution of an electrolyte salt as a modified method) or 2, an all solid-type polymer electrolyte comprising a polymer material containing an (alternative) copolymer of an ethylenically unsaturated compound and carbon monoxide and an electrolyte salt can be obtained. In addition, an all solid-type polymer electrolyte can be directly obtained by the Method 3. An amount of the solvent remaining after drying can be determined by NMR measurement, and when the amount is 1,000 ppm or less, all of the solvent is judged as being removed.

The all solid-type polymer electrolyte of the present invention has a characteristic of having an extremely high ionic conductivity, and those having ionic conductivity equivalent to that of a liquid electrolyte have been discovered. The reason why the all solid-type polymer electrolyte of the present invention exhibits high ionic conductivity is not clear, but it is supposed that a ketone carbonyl group contained in a polymer has strong interaction with an ion.

As an all solid-type polymer electrolyte, those using, for example, a polyethylene oxide-based polymer or a copolymer thereof having a polyether bond have been known so far, but either of them has ionic conductivity significantly lower that that of a liquid electrolyte, and therefore has not reached a practical level.

As described above, the all solid-type polymer electrolyte of the present invention contains absolutely no liquid electrolyte, but has high ionic conductivity, and when it is used for non-aqueous electrochemical devices such as a lithium primary battery, a lithium ion secondary battery and a non-aqueous electric double layer capacitor, the following effects are exerted.

1. The electrolyte exhibits high output characteristics equivalent to that of a liquid electrolyte.
2. The electrolyte is all solid-type one, and therefore has no concern of liquid leakage.
3. The electrolyte contains no liquid combustible material, and therefore has no flammability.
4. The electrolyte has sufficient flexibility and processability, and therefore is excellent in shape arbitrariness such as a thin film.
5. When the electrolyte is used as a bipolar electrode in which a positive electrode active material and a negative electrode active material are arranged on a front surface and a rear surface of a collector, respectively, there is absolutely no concern of an ion liquid junction between the positive electrode and the negative electrode formed on the front surface and the rear surface of the collector which may be formed in a case of a liquid electrolyte, and an electrochemical device having a high electromotive force of several ten V or more can be easily produced.

As described above, the all solid-type polymer electrolyte is used among the polymer electrolytes of the present invention, and thereby reliability, safety and characteristics of the resulting electrochemical device can be greatly improved.

A second aspect of the polymer electrolyte of the present invention includes, for example, a gel-type polymer electrolyte. That is, when a part of a solvent is removed in the Method 1 (including a method using a concentrated solution of an electrolyte salt as a modified method) or 2, an apparently solid gel-type polymer electrolyte containing an (alternative)

copolymer of an ethylenically unsaturated compound and carbon monoxide, an electrolyte salt and a solvent can be obtained. Although a composition ratio of a solvent to an (alternative) copolymer of an ethylenically unsaturated compound and carbon monoxide is appropriately selected depending on the purpose, the weight ratio of a solvent to the total weight of the solvent and the (alternative) copolymer is preferably less than 70% by weight, more preferably less than 50% by weight, and most preferably less than 33.3% by weight.

Further, when 100% of the polymer material is a copolymer of an ethylenically unsaturated compound and carbon monoxide, the weight ratio of a solvent to the total weight of the solvent and the copolymer is preferably less than 33.3% by weight, and more preferably less than 20% by weight. When the weight ratio is 33.3% by weight or more, reliability such as liquid leakage resistance is impaired and mechanical strength as a polymer electrolyte is decreased.

Generally, in the case of a gel-type polymer electrolyte, when the weight ratio of a solvent to be added is large, the resulting electrolyte has an antinomy relationship that ionic conductivity becomes high, but reliability such as liquid leakage resistance is impaired and mechanical strength as a polymer electrolyte is decreased.

However, as described above, even when the polymer electrolyte of the present invention is an all solid-type polymer electrolyte, sufficient high ionic conductivity can be obtained. Therefore, a gel-type polymer electrolyte remaining a part of a solvent is used as the polymer electrolyte of the present invention, and thereby the effect is exerted in a small amount of solvent as compared with a conventional gel-type polymer electrolyte even in the case of further increasing ionic conductivity, particularly ionic conductivity in a low temperature region, and therefore reliability such as liquid leakage resistance is hardly impaired.

The gel-type polymer electrolyte of the present invention will be further described.

An aqueous gel-type polymer electrolyte obtained when a solvent is water in the present invention substantially maintains high intrinsic ionic conductivity of an aqueous electrolyte solution. Accordingly, when the electrolyte is used for aqueous electrochemical devices such as an aqueous ion battery and an aqueous electric double layer capacitor, it causes no reduction in output characteristics, low temperature characteristics and the like, and provides significantly improved reliability, and therefore is useful.

Further, a non-aqueous gel-type polymer electrolyte obtained when a solvent is a non-aqueous solvent substantially maintains ionic conductivity of a non-aqueous electrolyte solution and maintains high ionic conductivity particularly in a low temperature region. Therefore, it is useful for non-aqueous electrochemical devices such as a dye-sensitized solar cell and an electrochromic device in addition to a lithium primary battery, a lithium ion secondary battery and a non-aqueous electric double layer capacitor.

As described above, a polymer electrolyte having a high ionic conductivity can be provided by using the (alternative) copolymer of an ethylenically unsaturated compound and carbon monoxide of the present invention, and can be used for various electrochemical devices as an all solid-type polymer electrolyte or gel-type polymer electrolyte depending on the purpose. Herein, the term "electrochemical device" is referred to as a device applying an electrochemical phenomenon involving an ion, and specific examples thereof include devices such as a storage device, a power generation device, a display device and a sensor device.

In the present invention, a polymer electrolyte may be a self-supporting film or a non-self-supporting film, and can be used without particular problems even if exudation of liquid is observed, but it is preferred that the electrolyte is a self-supporting film and no exudation of liquid is observed.

An example of an electrochemical device using the polymer electrolyte of the present invention will be described below.

FIG. 1 is a plan view and a longitudinal sectional view showing an example of an electrochemical device of the present invention. In FIG. 1, 1 indicates a positive electrode; 2 indicates a negative electrode; 3 indicates a positive electrode lead terminal; 4 indicates a negative electrode lead terminal; 5 indicates a polymer electrolyte; and 6 indicates a battery container.

Specific examples of the electrochemical device include a lithium primary battery using metal lithium as a negative electrode and using manganese dioxide, carbon fluoride or the like as a positive electrode; a lithium ion secondary battery using a carbon material, a metal oxide, a lithium alloy or the like as a negative electrode and using lithium cobaltate, lithium nickelate, lithium manganate, lithium iron phosphate or the like as a positive electrode; and an electric double layer capacitor using active carbon as a positive electrode and a negative electrode; and an aqueous ion battery using a lithium-transition metal composite oxide of vanadium, titanium, iron or the like as a negative electrode and using a lithium-transition metal composite oxide of cobalt, manganese, iron or the like as a positive electrode.

EXAMPLES

Hereinafter, the present invention will be specifically described by way of Examples and Comparative Examples.

Reference Example 1

Production of Polymer A

Into a 1 L-volume SUS autoclave with a stirrer, 800 ml of dimethyl carbonate as a polymerization solvent and 1.2 g of azobisisovaleronitrile as a polymerization initiator were charged, and subsequently a mixed gas having a pressure ratio of ethylene to carbon monoxide of 1 was charged so as to give a pressure of 4.5 MPa at room temperature. The temperature of the autoclave was raised to 60° C. while stirring. The mixture was reacted for 6 hours while adding the mixed gas so as to keep the pressure at 5 MPa. After cooling, the reactant is removed and the solid content was washed to obtain a white powder.

It was confirmed from $^{13}$C-NMR and an infrared absorption spectrum that this polymer was a product obtained by polymerizing ethylene and carbon monoxide (hereinafter, referred to as "Polymer A"), and the molar ratio of carbon monoxide was 43.2%. In addition, this Polymer A had a weight average molecular weight of 85,000.

Reference Example 2

Production of Polymer B

Completely the same operation as in Reference Example 1 was performed except that the pressure ratio of ethylene to carbon monoxide was changed to 2 in Reference Example 1. After cooling, the reactant was removed and the solid content was washed to obtain a white powder.

It was confirmed from $^{13}$C-NMR and an infrared absorption spectrum that this polymer was a product obtained by polymerizing ethylene and carbon monoxide (hereinafter, referred to as "Polymer B"), and the molar ratio of carbon monoxide was 21.3%. In addition, this Polymer B had a weight average molecular weight of 56,000.

Reference Example 3

Production of Polymer C

Completely the same operation as in Reference Example 1 was performed except that the pressure ratio of ethylene to carbon monoxide was changed to 10 in Reference Example 1. After cooling, the reactant was removed and the solid content was washed to obtain a white powder.

It was confirmed from $^{13}$C-NMR and an infrared absorption spectrum that this polymer was a product obtained by polymerizing ethylene and carbon monoxide (hereinafter, referred to as "Polymer C"), and the molar ratio of carbon monoxide was 10.9%. In addition, this Polymer C had a weight average molecular weight of 72,000.

Example 1

50 parts by weight of lithium bis(trifluoromethanesulfonyl)imide {$(CF_3SO_2)_2NLi$} as an electrolyte salt was mixed with and dissolved in 50 parts by weight of water to make a solution having a concentration of 50% by weight. 100 parts by weight of this solution and 85 parts by weight of Polymer A were charged into an autoclave, and the mixture was heated and stirred at 120° C. to obtain a transparent viscous solution.

After 0.1 parts by weight of hexamethylenediamine as a crosslinking agent was added to 100 parts by weight of this viscous solution, the mixture was cast to a thickness of 500 μm on a glass plate. Thereafter, the cast mixture was dried under atmospheric pressure at 80° C. for 1 hour to thereby obtain a non-sticky gel-type polymer electrolyte in a film form.

The weight ratio of water to the total of Polymer A and water determined by $^1$HNMR at this time point was 21.9% by weight. Here, the NMR measurement was performed using JNM-LA400 manufactured by JEOL Ltd. The ionic conductivity of this gel-type polymer electrolyte was measured at 30° C. and 0° C. in an alternating current of 1 KHz. The results are shown in Table 1.

Example 2

The same operation as in Example 1 was performed except that 85 parts by weight of Polymer A was replaced with a mixture of 75 parts by weight of Polymer A and 10 parts by weight of a polyether-based copolymer of ethylene oxide and 2-(2-methoxyethoxyethyl)glycidyl ether having a weight average molecular weight of 14,000 (copolymerization ratio=73:27, hereinafter referred to as "Polymer D") in Example 1. As a result, a non-sticky gel-type polymer electrolyte in a film form was obtained.

The weight ratio of water to the total of Polymer A, Polymer D and water was 22.5% by weight at this time point. The ionic conductivity of this gel-type polymer electrolyte was measured at 30° C. and 0° C. in an alternating current of 1 KHz. The results are shown in Table 1.

Example 3

The same operation as in Example 1 was performed except that 85 parts by weight of Polymer A was replaced with a mixture of 68 parts by weight of Polymer A and 17 parts by weight of Polymer D in Example 1. As a result, a non-sticky gel-type polymer electrolyte in a film form was obtained.

The weight ratio of water to the total of Polymer A, Polymer D and water was 23.3% by weight at this time point. The ionic conductivity of this gel-type polymer electrolyte was measured at 30° C. and 0° C. in an alternating current of 1 KHz. The results are shown in Table 1.

Example 4

The same operation as in Example 1 was performed except that 85 parts by weight of Polymer A was replaced with a mixture of 62 parts by weight of Polymer A and 23 parts by weight of Polymer D in Example 1. As a result, a non-sticky gel-type polymer electrolyte in a film form was obtained.

The weight ratio of water to the total of Polymer A, Polymer D and water was 24.5% by weight at this time point. The ionic conductivity of this gel-type polymer electrolyte was measured at 30° C. and 0° C. in an alternating current of 1 KHz. The results are shown in Table 1.

Example 5

The same operation as in Example 1 was performed except that 85 parts by weight of Polymer A was replaced with a mixture of 58 parts by weight of Polymer A and 27 parts by weight of Polymer D in Example 1. As a result, a non-sticky gel-type polymer electrolyte in a film form was obtained.

The weight ratio of water to the total of Polymer A, Polymer D and water was 21.9% by weight at this time point. The ionic conductivity of this gel-type polymer electrolyte was measured at 30° C. and 0° C. in an alternating current of 1 KHz. The results are shown in Table 1.

Comparative Example 1

The same operation as in Example 1 was performed except that 85 parts by weight of Polymer A was replaced with a mixture of 55 parts by weight of Polymer A and 30 parts by weight of Polymer D in Example 1. As a result, a slightly sticky gel-type polymer electrolyte in a film form was obtained.

The weight ratio of water to the total of Polymer A, Polymer D and water was 23.3% by weight at this time point. The ionic conductivity of this gel-type polymer electrolyte was measured at 30° C. and 0° C. in an alternating current of 1 KHz. The results are shown in Table 1.

Comparative Example 2

The same operation as in Example 1 was performed except that 85 parts by weight of Polymer A was replaced with a mixture of 35 parts by weight of Polymer A and 50 parts by weight of Polymer D in Example 1. As a result, a highly sticky gel-type polymer electrolyte in a film form was obtained.

The weight ratio of water to the total of Polymer A, Polymer D and water was 21.6% by weight at this time point. The ionic conductivity of this gel-type polymer electrolyte was measured at 30° C. and 0° C. in an alternating current of 1 KHz. The results are shown in Table 1.

Comparative Example 3

The same operation as in Example 1 was performed except that 85 parts by weight of Polymer A was replaced with 85 parts by weight of Polymer D in Example 1 and hexamethylenediamine was not used. As a result, a highly sticky gel-type polymer electrolyte in a film form was obtained.

The weight ratio of water to the total of Polymer D and water was 20.5% by weight at this time point. The ionic conductivity of this gel-type polymer electrolyte was measured at 30° C. and 0° C. in an alternating current of 1 KHz. The results are shown in Table 1.

[Table 1]

TABLE 1

| | Content of carbon oxide copolymer in polymer material (% by weight) | Ionic conductivity (mScm$^{-1}$) Upper row: 30° C. Lower row: 0° C. | Properties of polymer electrolyte |
|---|---|---|---|
| Example 1 | 100 | 9.5<br>6.3 | Self-supporting film causing no exudation of liquid |
| Example 2 | 88.2 | 9.0<br>5.7 | Self-supporting film causing no exudation of liquid |
| Example 3 | 80.0 | 7.9<br>4.9 | Self-supporting film causing no exudation of liquid |
| Example 4 | 72.9 | 7.2<br>4.5 | Self-supporting film causing no exudation of liquid |
| Example 5 | 68.2 | 6.1<br>3.9 | Self-supporting film causing no exudation of liquid |
| Comparative Example 1 | 64.7 | 1.1<br>0.9 | Self-supporting film having slight stickiness in which exudation of liquid was observed |
| Comparative Example 2 | 41.2 | 0.8<br>0.5 | Non-self-supporting film having high stickiness in which exudation of liquid was observed |
| Comparative Example 3 | 0 | 0.2<br>0.1 | Non-self-supporting film having high stickiness in which exudation of liquid was observed |

Example 6

30 parts by weight of lithium boron tetrafluoride (LiBF$_4$) as an electrolyte salt was mixed with and dissolved in 70 parts by weight of γ-butyrolactone to make a solution having a concentration of 30% by weight. 100 parts by weight of this solution and 120 parts by weight of Polymer B were charged into an autoclave and the mixture was heated and stirred at 120° C. to obtain a transparent viscous solution.

After this viscous solution was cast to a thickness of 500 μm on a glass plate, the cast solution was dried under atmospheric pressure at 120° C. for 1 hour. Thereafter, the glass plate was placed in a vacuum dryer set at 150° C. and further dried for 10 hours. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 2.

Example 7

The same operation as in Example 6 was performed except that 120 parts by weight of Polymer B was replaced with a mixture of 100 parts by weight of Polymer B and 20 parts by weight of a copolymer of vinylidene fluoride and hexafluoropropylene having a weight average molecular weight of 35,000 (copolymerization ratio=88:12, hereinafter referred to as "Polymer E") in Example 6. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 2.

Example 8

The same operation as in Example 6 was performed except that 120 parts by weight of Polymer B was replaced with a mixture of 85 parts by weight of Polymer B and 35 parts by weight of Polymer E in Example 6. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 2.

Comparative Example 4

The same operation as in Example 6 was performed except that 120 parts by weight of Polymer B was replaced with a mixture of 75 parts by weight of Polymer B and 45 parts by weight of Polymer E in Example 6. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 2.

Comparative Example 5

The same operation as in Example 6 was performed except that 120 parts by weight of Polymer B was replaced with a mixture of 45 parts by weight of Polymer B and 75 parts by weight of Polymer E in Example 6. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 2.

Comparative Example 6

The same operation as in Example 6 was performed except that 120 parts by weight of Polymer B was replaced with 120 parts by weight of Polymer E in Example 6. As a result, a film could not be obtained, but a white powder mixture was obtained.

The content of propylene carbonate in this

Polymer E determined by $^{13}$CNMR measurement was 1,000 ppm or less, but it was impossible to measure the ionic conductivity.

[Table 2]

TABLE 2

|  | Content of carbon oxide copolymer in polymer material (% by weight) | Ionic conductivity (mScm$^{-1}$) Upper row: 30° C. Lower row: 0° C. | Properties of polymer electrolyte |
|---|---|---|---|
| Example 6 | 100 | 2.1<br>1.6 | Self-supporting film causing no exudation of liquid |
| Example 7 | 83.3 | 1.9<br>1.2 | Self-supporting film causing no exudation of liquid |
| Example 8 | 70.8 | 1.2<br>0.9 | Self-supporting film causing no exudation of liquid |
| Comparative Example 4 | 62.5 | 0.2<br>0.1 | Brittle film |
| Comparative Example 5 | 37.5 | 0.09<br>0.03 | Brittle film |
| Comparative Example 6 | 0 | Unmeasurable<br>Unmeasurable | Powder form |

Example 9

After 75 parts by weight of Polymer A and 25 parts by weight of Polymer E were melted and kneaded, the mixture was formed into a film having a thickness of 150μ. This film was irradiated with electron rays with a dose of 5.0 Mrad to obtain a crosslinked film.

This film was immersed in a solution having a concentration of 20% by weight in which 20 parts by weight of lithium boron tetrafluoride (LiBF$_4$) mixed with and dissolved in 80 parts by weight of γ-butyrolactone, at 120° C. for 2 hours, and thereafter the film was cooled to room temperature and the surface of the film was washed. The film was swollen and the weight was increased by 85% based on the original weight.

The properties of composition, ionic conductivity and polymer electrolyte of this film were as shown in Table 3.

Example 10

The same operation as in Example 9 was performed except that the mixed ratio of polymers was changed to that of 68 parts by weight of Polymer A and 32 parts by weight of Polymer E in Example 9. As a result, a swollen film increased in weight by 215% based on the original weight was obtained.

The properties of composition, ionic conductivity and polymer electrolyte of this film were as shown in Table 3.

[Table 3]

TABLE 3

|  | Weight of solvent/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 9 | 40.5 | 5.3<br>3.2 | Self-supporting film causing no exudation of liquid |
| Example 10 | 63.2 | 6.7<br>4.1 | Self-supporting film causing no exudation of liquid |

Example 11

The present example shows an example of an electrochemical device of the present invention using a gel-type polymer electrolyte of the present invention.

FIG. 1 is a schematic cross-sectional view of this electrochemical device.

Preparation of Polymer Electrolyte Solution (1)

Lithium boron tetrafluoride (LiBF$_4$), propylene carbonate and Polymer A were charged at a weight ratio of 20:70:100, and the mixture was heated and stirred at 120° C. to obtain a viscous solution.

Preparation of Positive Electrode Sheet

LiCoO$_2$ (average particle size: 5 μm) as a positive electrode active material, and graphite and acetylene black as conductive auxiliaries were dry-mixed at a weight ratio of 100:5:2.5.

After 100 parts by weight of a polymer electrolyte solution (1) and 100 parts by weight of the mixture of a positive electrode active material and conductive auxiliaries were kneaded to be made in a paste form, the mixture was applied to one surface of an aluminum foil positive electrode collector having a thickness of 15 μm at a thickness of 200 μm. The collector was dried at 150° C. for 2 hours to obtain a positive electrode sheet.

The content of propylene carbonate contained in this positive electrode sheet was 12.3% by weight based on the total weight of the positive electrode sheet excluding an aluminum foil positive electrode collector.

Preparation of Negative Electrode Sheet

After 50 parts by weight of graphite (average particle size: 10 μm) as a negative electrode active material was kneaded with 100 parts by weight of a polymer electrolyte solution (1) to be made in a paste form, the mixture was applied to one surface of a copper foil negative electrode collector having a thickness of 18 μm at a thickness of 150 μm. The collector was dried at 150° C. for 2 hours to obtain a negative electrode sheet.

The content of propylene carbonate contained in this negative electrode sheet was 14.4% by weight based on the total weight of the negative electrode sheet excluding a copper foil negative electrode collector.

Preparation of Electrochemical Device

Polymer C was press-molded at 210° C. to prepare a film having a thickness of 18 μm. This film was immersed in a solution in which the weight ratio of lithium boron tetrafluoride ($LiBF_4$) to propylene carbonate is 40:60. The film was left standing at room temperature for 24 hours, and thereby swollen and a polymer electrolyte film increased in weight by 48.3% based on the original weight was obtained.

The positive electrode sheet and the negative electrode sheet were laminated interposing this polymer electrolyte film therebetween to assemble an electrochemical device shown in FIG. 1.

Property Evaluation of Electrochemical Device

The evaluation of charge and discharge properties of this electrochemical device was performed as follows. After charging in a constant-current/constant-voltage charging mode of a maximum current of 50 mA and a maximum voltage of 4.2 V for 5 hours, the electrochemical device was discharged to 3.0 V at a constant current of 10 mA. The discharge volume was 86.2 mAh. Thereafter, the electrochemical device was recharged in the same condition, and the evaluation of discharge volume was performed under a constant current condition shown in Table 4. The results are shown in Table 4.

Example 12

Preparation of Polymer Electrolyte Solution (2)

Lithium boron tetrafluoride ($LiBF_4$), polypropylene carbonate, Polymer A and Polymer E were charged at a weight ratio of 20:70:75:25, and the mixture was heated and stirred at 120° C. to obtain a viscous solution.

Preparation of Positive Electrode Sheet

A positive electrode sheet was obtained in the same manner as in Example 11 except for using the Polymer Electrolyte Solution (2).

The content of propylene carbonate contained in this positive electrode sheet was 11.9% by weight based on the total weight of the positive electrode sheet excluding an aluminum foil positive electrode collector.

Preparation of Negative Electrode Sheet

A negative electrode sheet was obtained in the same manner as in Example 11 except for using the Polymer Electrolyte Solution (2).

The content of propylene carbonate contained in this negative electrode sheet was 14.9% by weight based on the total weight of the negative electrode sheet excluding a copper foil negative electrode collector.

Preparation of Electrochemical Device

A polymer electrolyte film increased in weight by 39.5% by weight based on the original weight was obtained in the same manner as in Example 11 was performed except that a mixture having a weight ratio of Polymer C to Polymer E of 75:25 was used as a film material.

The positive electrode sheet and the negative electrode sheet were laminated interposing this polymer electrolyte film therebetween to assemble an electrochemical device shown in FIG. 1.

Property Evaluation of Electrochemical Device

The evaluation of charge and discharge properties of this electrochemical device was performed in the same manner as in Example 11. The results are shown in Table 4.

Comparative Example 7

Preparation of Polymer Electrolyte Solution (3)

Lithium boron tetrafluoride ($LiBF_4$), propylene carbonate, Polymer A and Polymer E were charged at a weight ratio of 20:70:60:40, and the mixture was heated and stirred at 120° C. to obtain a viscous solution.

Preparation of Positive Electrode Sheet

A positive electrode sheet was obtained in the same manner as in Example 11 except for using the Polymer Electrolyte Solution (3).

The content of propylene carbonate contained in this positive electrode sheet was 12.6% by weight based on the total weight of the positive electrode sheet excluding an aluminum foil positive electrode collector.

Preparation of Negative Electrode Sheet

A negative electrode sheet was obtained in the same manner as in Example 11 except for using the Polymer Electrolyte Solution (3).

The content of propylene carbonate contained in this negative electrode sheet was 15.8% by weight based on the total weight of the negative electrode sheet excluding a copper foil negative electrode collector.

Preparation of Electrochemical Device

A polymer electrolyte film increased in weight by 33.9% by weight based on the original weight was obtained in the same manner as in Example 11 was performed except that a mixture having a weight ratio of Polymer C to Polymer E of 60:40 was used as a film material.

The positive electrode sheet and the negative electrode sheet were laminated interposing this polymer electrolyte film therebetween to assemble an electrochemical device shown in FIG. 1.

Property Evaluation of Electrochemical Device

The evaluation of charge and discharge properties of this electrochemical device was performed in the same manner as in Example 11. The results are shown in Table 4.

[Table 4]

TABLE 4

| | Content of carbon oxide copolymer in polymer material | Discharge condition (mA) and discharge volume (mAh) | | |
|---|---|---|---|---|
| | (% by weight) | 10 mA | 50 mA | 100 mA |
| Example 11 | 100 | 86.2 mAh | 80.6 mAh | 76.7 mAh |
| Example 12 | 75.0 | 80.1 mAh | 75.3 mAh | 69.6 mAh |
| Comparative Example 7 | 60.0 | 24.9 mAh | 9.1 mAh | Non-dischargeable |

Example 13

50 parts by weight of lithium bis(trifluoromethanesulfonyl)imide $\{(CF_3SO_2)_2NLi\}$ as an electrolyte salt was mixed with and dissolved in 50 parts by weight of water to make a solution having a concentration of 50% by weight. 100 parts by weight of this solution and 75 parts by weight of Polymer A were charged into an autoclave and the mixture was heated and stirred at 120° C. to obtain a transparent viscous solution.

After 0.1 parts by weight of hexamethylenediamine as a crosslinking agent was added to 100 parts by weight of this viscous solution, the mixture was cast to a thickness of 500 μm on a glass plate. Thereafter, the cast mixture was dried under atmospheric pressure at 80° C. for 1 hour to thereby obtain a slightly sticky gel-type polymer electrolyte in a film form.

The weight ratio of water to the total of Polymer A and water determined by $^1$HNMR measurement at this time point was 32.1% by weight. Here, the NMR measurement was performed using JNM-LA400 manufactured by JEOL Ltd. The ionic conductivity of this gel-type polymer electrolyte was measured at 30° C. and 0° C. in an alternating current of 1 KHz. The results are shown in Table 5.

Example 14

The same operation as in Example 13 was performed except that the drying hour at 80° C. was changed to 3 hours in Example 13. As a result, a substantially non-sticky gel-type polymer electrolyte in a film form was obtained.

The weight ratio of water to the total of a polymer of ethylene and carbon monoxide and water was 19.3% by weight at this time point. The ionic conductivity of this gel-type polymer electrolyte was measured at 30° C. and 0° C. in an alternating current of 1 KHz. The results are shown in Table 5.

Example 15

The same operation as in Example 13 was performed except that the drying hour at 80° C. was changed to 6 hours in Example 13. As a result, an absolutely non-sticky gel-type polymer electrolyte in a film form was obtained.

The weight ratio of water to the total of a polymer of ethylene and carbon monoxide and water was 9.2% by weight at this time point. The ionic conductivity of this gel-type polymer electrolyte was measured at 30° C. and 0° C. in an alternating current of 1 KHz. The results are shown in Table 5.

Example 16

After a viscous solution obtained in the same manner as in Example 13 was cast to a thickness of 500 μm on a glass plate, the cast solution was dried under atmospheric pressure at 120° C. for 3 hour. Thereafter, the glass plate was placed in a vacuum dryer set at 150° C. and further dried for 10 hours. As a result, an all solid-type polymer electrolyte in a film form having a water content of 1,000 ppm or less determined by $^1$HNMR measurement was obtained.

The ionic conductivity of this all solid-type polymer electrolyte was measured at 30° C. and 0° C. in an alternating current of 1 KHz. The results are shown in Table 5.

Example 17

The same operation as in Example 13 was performed except that the drying hour at 80° C. was changed to 0.5 hours in Example 13. As a result, a highly sticky and non-self-supporting gel-type polymer electrolyte was obtained.

The weight ratio of water to the total of a polymer of ethylene and carbon monoxide and water was 35.7% by weight at this time point. The ionic conductivity of this gel-type polymer electrolyte was measured at 30° C. and 0° C. in an alternating current of 1 KHz. The results are shown in Table 5.

[Table 5]

TABLE 5

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 13 | 32.1 | 10.3 / 7.1 | Self-supporting film having slight stickiness but causing no exudation of liquid |
| Example 14 | 19.3 | 8.1 / 5.2 | Self-supporting film causing no exudation of liquid |
| Example 15 | 8.9 | 6.9 / 3.9 | Self-supporting film causing no exudation of liquid |
| Example 16 | 0 | 4.1 / 1.2 | Self-supporting film causing no exudation of liquid |
| Example 17 | 35.7 | 10.1 / 6.9 | Non-self-supporting film having high stickiness in which exudation of liquid was observed |

Example 18

30 parts by weight of lithium boron tetrafluoride (LiBF$_4$) as an electrolyte salt was mixed with and dissolved in 70 parts by weight of γ-butyrolactone to make a solution having a concentration of 30% by weight (hereinafter, referred to as "Solution A"). 100 parts by weight of this solution and 95 parts by weight of Polymer B were charged and the mixture was heated and stirred at 120° C. to obtain a transparent viscous solution.

After this viscous solution was cast to a thickness of 500 μm on a glass plate, the cast solution was dried under atmospheric pressure at 120° C. for 2 hours. As a result, a slightly sticky gel-type polymer electrolyte in a film form was obtained.

The weight ratio of γ-butyrolactone to the total of a polymer of ethylene and carbon monoxide and γ-butyrolactone determined by $^{13}$CNMR measurement was 31.9% by weight at this time point. The ionic conductivity of this gel-type polymer electrolyte was measured at 30° C. and 0° C. in an alternating current of 1 KHz. The results are shown in Table 6.

Example 19

The same operation as in Example 18 was performed except that the drying condition was changed to drying at 120° C. for 3 hours in Example 18. As a result, a substantially non-sticky gel-type polymer electrolyte in a film form was obtained.

The weight ratio of γ-butyrolactone to the total of a polymer of ethylene and carbon monoxide and γ-butyrolactone was 18.3% by weight at this time point. The ionic conductivity of this gel-type polymer electrolyte was measured at 30° C. and 0° C. in an alternating current of 1 KHz. The results are shown in Table 6.

Example 20

The same operation as in Example 18 was performed except that the drying condition was changed to drying at 120° C. for 6 hours in Example 18. As a result, an absolutely non-sticky gel-type polymer electrolyte in a film form was obtained.

The weight ratio of γ-butyrolactone to the total of a polymer of ethylene and carbon monoxide and γ-butyrolactone was 7.2% by weight at this time point.

The ionic conductivity of this gel-type polymer electrolyte was measured at 30° C. and 0° C. in an alternating current of 1 KHz. The results are shown in Table 6.

Example 21

100 parts by weight of Solution A obtained in the same manner as in Example 18 and 95 parts by weight of Polymer B were charged into an autoclave, and the mixture was heated and stirred at 120° C. to obtain a transparent viscous solution.

After this viscous solution was cast to a thickness of 500 μm on a glass plate, the cast solution was dried under atmospheric pressure at 120° C. for 1 hour. Thereafter, the glass plate was placed in a vacuum dryer set at 150° C. and further dried for 10 hours. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 6.

Example 22

The same operation as in Example 18 was performed except that the drying condition was changed to drying at 120° C. for 1 hour in Example 18. As a result, a highly sticky and non-self-supporting gel-type polymer electrolyte was obtained.

The weight ratio of γ-butyrolactone to the total of a polymer of ethylene and carbon monoxide and γ-butyrolactone was 41.3% by weight at this time point. The ionic conductivity of this gel-type polymer electrolyte was measured at 30° C. and 0° C. in an alternating current of 1 KHz. The results are shown in Table 6.

[Table 6]

TABLE 6

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 18 | 31.9 | 2.6 / 2.1 | Self-supporting film having slight stickiness but causing no exudation of liquid |
| Example 19 | 18.3 | 2.1 / 1.8 | Self-supporting film causing no exudation of liquid |
| Example 20 | 7.2 | 1.9 / 1.1 | Self-supporting film causing no exudation of liquid |
| Example 21 | 0 | 1.3 / 0.5 | Self-supporting film causing no exudation of liquid |
| Example 22 | 41.3 | 2.7 / 2.2 | Non-Self-supporting film having high stickiness in which exudation of liquid was observed |

Comparative Example 8

100 parts by weight of Polymer E, 25 parts by weight of lithium bis(trifluoromethanesulfonyl)imide {$(CF_3SO_2)_2$NLi} as an electrolyte salt and 120 parts by weight of propylene carbonate were mixed with and dissolved in 200 parts by weight of dimethylformamide at 60° C.

After this solution was cast to a thickness of 500 μm on a glass plate, the cast solution was dried under atmospheric pressure at 120° C. for 2 hours. As a result, a slightly sticky gel-type polymer electrolyte in a film form was obtained.

The weight ratio of propylene carbonate to the total weight of Polymer E and propylene carbonate was 45.3% by weight at this time point, and dimethylformamide was not remained. The ionic conductivity of this gel-type polymer electrolyte was measured at 30° C. and 0° C. in an alternating current of 1 KHz. The results are shown in Table 7.

Comparative Example 9

The same operation as in Comparative Example 8 was performed except that the drying condition was changed to drying at 150° C. for 3 hours in Comparative Example 8. As a result, a substantially non-sticky gel-type polymer electrolyte in a film form was obtained.

The weight ratio of propylene carbonate to the total weight of Polymer E and propylene carbonate was 24.8% by weight at this time point. The ionic conductivity of this gel-type polymer electrolyte was measured at 30° C. and 0° C. in an alternating current of 1 KHz. The results are shown in Table 7.

Comparative Example 10

The same operation as in Comparative Example 8 was performed except that the drying condition was changed to drying at 150° C. for 6 hours in Comparative Example 8. As a result, a very brittle gel-type polymer electrolyte in a film form was obtained.

The weight ratio of propylene carbonate to the total weight of Polymer E and propylene carbonate was 16.8% by weight at this time point. The ionic conductivity of this gel-type polymer electrolyte was measured at 30° C. and 0° C. in an alternating current of 1 KHz. The results are shown in Table 7.

Comparative Example 11

After the solution containing Polymer E and the electrolyte salt obtained in the same manner as in Comparative Example 8 was cast to a thickness of 500 μm on a glass plate, the cast solution was dried under atmospheric pressure at 120° C. for 2 hours. Thereafter, the glass plate was placed in a vacuum dryer set at 150° C. and further dried for 10 hours. As a result, a film could not be obtained, but a white powder mixture was obtained.

The content of propylene carbonate in this mixture was 1,000 ppm or less, but it was impossible to measure the ionic conductivity.

Comparative Example 12

100 parts by weight of Polymer D and 25 parts by weight of lithium bis(trifluoromethanesulfonyl)imide $\{(CF_3SO_2)_2NLi\}$ as an electrolyte salt were mixed with and dissolved in 250 parts by weight of acetonitrile.

After this solution was cast to a thickness of 500 μm on a glass plate, the cast solution was dried under atmospheric pressure at 80° C. for 2 hours. As a result, an all solid-type polymer electrolyte in a film form in which acetonitrile was completely volatilized was obtained.

The ionic conductivity of this all solid-type polymer electrolyte was measured at 30° C. and 0° C. in an alternating current of 1 KHz. The results are shown in Table 7.

[Table 7]

TABLE 7

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Comparative Example 8 | 45.3 | 0.93 0.29 | Non-self-supporting film having high stickiness in which exudation of liquid was observed |
| Comparative Example 9 | 24.8 | 0.39 0.13 | Self-supporting film having slight stickiness in which exudation of liquid was observed |
| Comparative Example 10 | 16.8 | 0.09 0.01 | Brittle film |
| Comparative Example 11 | 0 | Unmeasurable Unmeasurable | Powder form |
| Comparative Example 12 | 0 | 0.11 0.03 | Self-supporting film |

Example 23

The present example shows an example of an electrochemical device of the present invention using a gel-type polymer electrolyte of the present invention. FIG. 1 is a schematic cross-sectional view of this electrochemical device.

Preparation of Polymer Electrolyte Solution (4)

Lithium boron tetrafluoride (LiBF$_4$), polypropylene carbonate and Polymer A were charged at a weight ratio of 20:80:100, and the mixture was heated and stirred at 120° C. to obtain a viscous solution.

Preparation of Positive Electrode Sheet

LiCoO$_2$ (average particle size: 5 μm) as a positive electrode active material, and graphite and acetylene black as conductive auxiliaries were dry-mixed at a weight ratio of 100:5:2.5.

After 100 parts by weight of a polymer electrolyte solution (4) and 100 parts by weight of the mixture of a positive electrode active material and conductive auxiliaries were kneaded to be made in a paste form, the mixture was applied to one surface of an aluminum foil positive electrode collector having a thickness of 15 μm at a thickness of 200 μm. The collector was dried at 150° C. for 2 hours to obtain a positive electrode sheet.

The content of propylene carbonate contained in this positive electrode sheet was 11.8% by weight based on the total weight of the positive electrode sheet excluding an aluminum foil positive electrode collector.

Preparation of Negative Electrode Sheet

After 50 parts by weight of graphite (average particle size: 10 μm) as a negative electrode active material was kneaded with 100 parts by weight of a polymer electrolyte solution (4) to be made in a paste form, the mixture was applied to one surface of a copper foil negative electrode collector having a thickness of 18 μm at a thickness of 150 μm. The collector was dried at 150° C. for 2 hours to obtain a negative electrode sheet.

The content of propylene carbonate contained in this negative electrode sheet was 15.4% by weight based on the total weight of the negative electrode sheet excluding a copper foil negative electrode collector.

Preparation of Electrochemical Device

Polymer C was press-molded at 210° C. to prepare a film having a thickness of 18 μm. This film was immersed in a solution in which the weight ratio of lithium boron tetrafluoride (LiBF$_4$) to propylene carbonate is 40:60. The film was left standing at room temperature for 24 hours, and thereby swollen and a polymer electrolyte film increased in weight by 48.3% based on the original weight was obtained.

The positive electrode sheet and the negative electrode sheet were laminated interposing this polymer electrolyte film therebetween to assemble an electrochemical device shown in FIG. 1.

Property Evaluation of Electrochemical Device

The evaluation of charge and discharge properties of this electrochemical device was performed as follows. After charging in a constant-current/constant-voltage charging mode of a maximum current of 50 mA and a maximum voltage of 4.2 V for 5 hours, the electrochemical device was discharged to 3.0 V at a constant current of 10 mA. The discharge volume was 88.3 mAh. Thereafter, the electrochemical device was recharged in the same condition, and the evaluation of discharge volume was performed under a constant current condition shown in Table 8. The results are shown in Table 8.

Example 24

The present example shows an example of an electrochemical device of the present invention using an all solid-type polymer electrolyte of the present invention. FIG. 1 is a schematic cross-sectional view of this electrochemical device.

Preparation of Positive Electrode Sheet

A mixture of a positive electrode active material and conductive auxiliaries obtained in the same manner as in Example 23, lithium bis(pentafluoroethanesulfonyl)imide {$(CF_3CF_2SO_2)_2NLi$}, propylene carbonate and Polymer A were charged at a weight ratio of 100:20:30:50, and the mixture was heated and kneaded at 150° C.

This kneaded product was extruded into a sheet form at a thickness of 200 μm on an aluminum foil positive electrode collector having a thickness of 15 μm. Thereafter, the collector was dried at 180° C. for 2 hours to obtain a positive electrode sheet.

The content of propylene carbonate contained in this positive electrode sheet was 1,000 ppm or less based on the total weight of the positive electrode sheet excluding an aluminum foil positive electrode collector.

Preparation of Negative Electrode Sheet

Graphite (average particle size: 10 μm) as a negative electrode active material, lithium bis(pentafluoroethanesulfonyl) imide {$(CF_3CF_2SO_2)_2NLi$}, propylene carbonate and Polymer A were charged at a weight ratio of 50:20:30:50, and the mixture was heated and kneaded at 150° C.

This kneaded product was extruded into a sheet form at a thickness of 150 μm on a copper foil negative electrode collector having a thickness of 18 μm. Thereafter, the collector was dried at 180° C. for 2 hours to obtain a negative electrode sheet.

The content of propylene carbonate contained in this negative electrode sheet was 1,000 ppm or less based on the total weight of the negative electrode sheet excluding a copper foil negative electrode collector.

Preparation of Electrochemical Device

Lithium bis(pentafluoroethanesulfonyl)imide {$(CF_3CF_2SO_2)_2NLi$}, propylene carbonate and Polymer A were charged at a weight ratio of 20:30:50, and the mixture was heated and kneaded at 150° C.

This kneaded product was extruded into a sheet form at a thickness of 20 μm on the surface of the above-prepared positive electrode sheet, and then the above-prepared negative electrode sheet was laminated thereon. After this electrode group was dried at 180° C. for 2 hours, an electrochemical device shown in FIG. 1 was assembled.

Property Evaluation of Electrochemical Device

The evaluation of charge and discharge properties of this electrochemical device was performed in the same manner as in Example 23. The results are shown in Table 8.

Comparative Example 13

The present example shows a comparative example of an electrochemical device using a polyether-based all solid-type polymer electrolyte. FIG. 1 is a schematic cross-sectional view of this electrochemical device.

Preparation of Polymer Electrolyte Solution (5)

Lithium bis(pentafluoroethanesulfonyl)imide {$(CF_3CF_2SO_2)_2NLi$} as a electrolyte, acetonitrile as a solvent and Polymer D were charged at a weight ratio of 10:100:40, and then mixed and stirred to obtain a solution.

Preparation of Positive Electrode Sheet

A positive electrode sheet was obtained in the same manner as in Example 23 except that the polymer electrolyte solution (5) was used and the drying temperature was changed to 80° C.

The content of acetonitrile contained in this positive electrode sheet was 1,000 ppm or less based on the total weight of the positive electrode sheet excluding an aluminum foil positive electrode collector.

Preparation of Negative Electrode Sheet

A negative electrode sheet was obtained in the same manner as in Example 23 except that the polymer electrolyte solution (5) was used and the drying temperature was changed to 80° C.

The content of acetonitrile contained in this negative electrode sheet was 1,000 ppm or less based on the total weight of the negative electrode sheet excluding a copper foil negative electrode collector.

Preparation of Electrochemical Device

The polymer electrolyte solution (5) was applied onto the surface of the above-prepared positive electrode sheet, and then dried to form a coating layer having a thickness of 20 μm.

The positive electrode sheet having this coating layer and the above-prepared negative electrode sheet were laminated to assemble an electrochemical device shown in FIG. 1.

Property Evaluation of Electrochemical Device

The evaluation of charge and discharge properties of this electrochemical device was performed in the same manner as in Example 23. The results are shown in Table 8.

[Table 8]

TABLE 8

| | Discharge condition (mA) and discharge volume (mAh) | | |
| --- | --- | --- | --- |
| | 10 mA | 50 mA | 100 mA |
| Example 23 | 83.3 mAh | 80.9 mAh | 77.4 mAh |
| Example 24 | 81.3 mAh | 76.5 mAh | 70.9 mAh |
| Comparative Example 13 | 11.4 mAh | 5.3 mAh | Non-dischargeable |

Reference Example 4

Production of Polymer F 1.0 μmol of palladium acetate, 1.2 μmol of 1,3-bis{di(2-methoxyphenyl)phosphino}propane and 50 μmol of sulfuric acid were dissolved in 100 ml of a mixed solvent of methanol and water containing 18% water, and this solution was charged into a 200 ml-volume stainless steel autoclave purged with nitrogen. Next, 1 mg of 1,4-benzoquinon was added and the autoclave was hermetically closed, and then the content was heated while stirring, and at the time point when the inner temperature reached 90° C., ethylene was added until the inner pressure of the reactor becomes 5.0 MPa. Subsequently, carbon monoxide was added until the inner pressure of the reactor becomes 8.0 MPa. Stirring was continued for 4 hours while maintaining the inner temperature and the inner pressure in this condition. After cooling, the content was removed therefrom.

The reaction solution was washed with methanol, and then dried under reduced pressure to obtain 21.3 g of a polymer. It was confirmed from $^{13}$C-NMR and an infrared absorption spectrum that this polymer was substantially an alternative copolymer in which ethylene and carbon monoxide were alternatively polymerized (hereinafter, referred to as "Polymer F"). This Polymer F had a weight average molecular weight of 75,000.

Reference Example 5

Production of Polymer G

Completely the same operation as in Reference Example 4 was performed except that propylene was used in place of ethylene in Reference Example 4.

The reaction solution was washed with methanol, and then dried under reduced pressure to obtain 18.7 g of a polymer. It was confirmed from $^{13}$C-NMR and an infrared absorption spectrum that this polymer was substantially an alternative copolymer in which propylene and carbon monoxide were alternatively polymerized (hereinafter, referred to as "Polymer G"). This Polymer G had a weight average molecular weight of 47,000.

Example 25

60 parts by weight of lithium bis(trifluoromethanesulfonyl)imide {$(CF_3SO_2)_2NLi$} as an electrolyte salt was mixed with and dissolved in 40 parts by weight of water to make a solution having a concentration of 60% by weight (hereinafter, referred to as "Solution B"). 100 parts by weight of this solution and 55 parts by weight of Polymer F were charged into an autoclave and the mixture was heated and stirred at 120° C. to obtain a transparent viscous solution.

After 0.1 parts by weight of hexamethylenediamine as a crosslinking agent was added to 100 parts by weight of this viscous solution, the mixture was cast to a thickness of 500 μm on a glass plate. Thereafter, the cast mixture was dried under atmospheric pressure at 80° C. for 1 hour to thereby obtain a slightly sticky gel-type polymer electrolyte in a film form.

The weight ratio of water to the total of Polymer F and water determined by $^1$HNMR measurement at this time point was 25.3% by weight. Here, the NMR measurement was performed using JNM-LA400 manufactured by JEOL Ltd. The ionic conductivity of this gel-type polymer electrolyte was measured at 30° C. and 0° C. in an alternating current of 1 KHz. The results are shown in Table 9.

Example 26

The same operation as in Example 25 was performed except that the drying hour at 80° C. was changed to 3 hours in Example 25. As a result, a substantially non-sticky gel-type polymer electrolyte in a film form was obtained.

The weight ratio of water to the total of Polymer F and water was 18.6% by weight at this time point. The ionic conductivity of this gel-type polymer electrolyte was measured at 30° C. and 0° C. in an alternating current of 1 KHz. The results are shown in Table 9.

Example 27

The same operation as in Example 25 was performed except that the drying hour at 80° C. was changed to 6 hours in Example 25. As a result, an absolutely non-sticky gel-type polymer electrolyte in a film form was obtained.

The weight ratio of water to the total of Polymer F and water was 9.2% by weight at this time point. The ionic conductivity of this gel-type polymer electrolyte was measured at 30° C. and 0° C. in an alternating current of 1 KHz. The results are shown in Table 9.

Example 28

After a viscous solution obtained in the same manner as in Example 25 was cast to a thickness of 500 μm on a glass plate, the cast solution was dried under atmospheric pressure at 120° C. for 3 hours. Thereafter, the glass plate was placed in a vacuum dryer set at 150° C. and further dried for 10 hours. As a result, an all solid-type polymer electrolyte in a film form having a water content of 1,000 ppm or less determined by $^1$HNMR measurement was obtained.

The ionic conductivity of this all solid-type polymer electrolyte was measured at 30° C. and 0° C. in an alternating current of 1 KHz. The results are shown in Table 9.

Comparative Example 14

The ionic conductivity of Solution B used in Example 25 was measured at 30° C. and 0° C. in an alternating current of 1 KHz. The results are shown in Table 9.

[Table 9]

TABLE 9

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 25 | 25.3 | 11.4<br>7.9 | Self-supporting film having slight stickiness but causing no exudation of liquid |
| Example 26 | 18.6 | 9.5<br>5.9 | Self-supporting film causing no exudation of liquid |

TABLE 9-continued

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 27 | 9.2 | 7.8 4.3 | Self-supporting film causing no exudation of liquid |
| Example 28 | 0 | 5.5 1.5 | Self-supporting film causing no exudation of liquid |
| Comparative Example 14 | 100 | 52.4 31.3 | Liquid |

Example 29

40 parts by weight of lithium boron tetrafluoride (LiBF$_4$) as an electrolyte salt was mixed with and dissolved in 60 parts by weight of γ-butyrolactone to make a solution having a concentration of 40% by weight (hereinafter, referred to as "Solution C"). 100 parts by weight of this solution and 60 parts by weight of Polymer G were charged and the mixture was heated and stirred at 120° C. to obtain a transparent viscous solution.

After this viscous solution was cast to a thickness of 500 μm on a glass plate, the cast solution was dried under atmospheric pressure at 120° C. for 2 hours. As a result, a gel-type polymer electrolyte in a film form having slight stickiness was obtained.

The weight ratio of γ-butyrolactone to the total of Polymer G and γ-butyrolactone determined by $^{13}$CNMR measurement was 28.8% by weight at this time point. The ionic conductivity of this gel-type polymer electrolyte was measured at 30° C. and 0° C. in an alternating current of 1 KHz. The results are shown in Table 10.

Example 30

The same operation as in Example 29 was performed except that the drying condition was changed to drying at 120° C. for 3 hours in Example 29. As a result, a substantially non-sticky gel-type polymer electrolyte in a film form was obtained.

The weight ratio of γ-butyrolactone to the total of Polymer G and γ-butyrolactone was 18.5% by weight at this time point. The ionic conductivity of this gel-type polymer electrolyte was measured at 30° C. and 0° C. in an alternating current of 1 KHz. The results are shown in Table 10.

Example 31

The same operation as in Example 29 was performed except that the drying condition was changed to drying at 120° C. for 6 hours in Example 29. As a result, an absolutely non-sticky gel-type polymer electrolyte in a film form was obtained.

The weight ratio of γ-butyrolactone to the total of Polymer G and γ-butyrolactone was 8.4% by weight at this time point. The ionic conductivity of this gel-type polymer electrolyte was measured at 30° C. and 0° C. in an alternating current of 1 KHz. The results are shown in Table 10.

Example 32

100 parts by weight of Solution C obtained in the same manner as in Example 29 and 80 parts by weight of Polymer G were charged into an autoclave, and the mixture was heated and stirred at 120° C. to obtain a transparent viscous solution.

After this viscous solution was cast to a thickness of 500 μm on a glass plate, the cast solution was dried under atmospheric pressure at 120° C. for 1 hour. Thereafter, the glass plate was placed in a vacuum dryer set at 150° C. and further dried for 10 hours. As a result, an all solid-type polymer electrolyte in a film form having a γ-butyrolactone content of 1,000 ppm or less determined by $^{13}$CNMR measurement was obtained.

The ionic conductivity of this all solid-type polymer electrolyte was measured at 30° C. in an alternating current of 1 KHz. The result is shown in Table 10.

Comparative Example 15

The ionic conductivity of Solution C used in Example 29 was measured at 30° C. and 0° C. in an alternating current of 1 KHz. The results are shown in Table 10.

[Table 10]

TABLE 10

| | (Weight of solvent)/ (Weight of solvent and high polymer) (% by weight) | Ionic conductivity (mScm$^{-1}$) Upper row: 30° C. Lower row: 0° C. | Properties of polymer electrolyte |
|---|---|---|---|
| Example 29 | 28.8 | 3.1 2.3 | Self-supporting film having slight stickiness but causing no exudation of liquid |
| Example 30 | 18.5 | 2.8 2.1 | Self-supporting film causing no exudation of liquid |
| Example 31 | 8.4 | 2.1 1.7 | Self-supporting film causing no exudation of liquid |
| Example 32 | 0 | 1.9 0.9 | Self-supporting film causing no exudation of liquid |
| Comparative Example 15 | 100 | 3.4 2.2 | Liquid |

Example 33

The present example shows an example of an electrochemical device of the present invention using a gel-type polymer electrolyte of the present invention. FIG. 1 is a schematic cross-sectional view of this electrochemical device.

Preparation of Polymer Electrolyte Solution (6)

Lithium boron tetrafluoride (LiBF$_4$), propylene carbonate and Polymer F were charged at a weight ratio of 40:60:60, and the mixture was heated and stirred at 120° C. to obtain a viscous solution.

Preparation of Positive Electrode Sheet

LiCoO$_2$ (average particle size: 5 μm) as a positive electrode active material, and graphite and acetylene black as conductive auxiliaries were dry-mixed at a weight ratio of 100:5:2.5.

After 100 parts by weight of a polymer electrolyte solution (6) and 100 parts by weight of the mixture of a positive electrode active material and conductive auxiliaries were kneaded to be made in a paste form, the mixture was applied to one surface of an aluminum foil positive electrode collector having a thickness of 15 μm at a thickness of 200 μm. The collector was dried at 150° C. for 2 hours to obtain a positive electrode sheet.

The content of propylene carbonate contained in this positive electrode sheet was 11.2% by weight based on the total weight of the positive electrode sheet excluding an aluminum foil positive electrode collector.

Preparation of Negative Electrode Sheet

After 50 parts by weight of graphite (average particle size: 10 μm) as a negative electrode active material was kneaded with 100 parts by weight of a polymer electrolyte solution (6) to be made in a paste form, the mixture was applied to one surface of a copper foil negative electrode collector having a thickness of 18 μm at a thickness of 150 μm. The collector was dried at 150° C. for 2 hours to obtain a negative electrode sheet.

The content of propylene carbonate contained in this negative electrode sheet was 16.5% by weight based on the total weight of the negative electrode sheet excluding a copper foil negative electrode collector.

Preparation of Electrochemical Device

The polymer electrolyte solution (6) was applied onto the surface of the above-prepared positive electrode sheet, and then dried at 100° C. for 1 hour to form a coating layer composed of polymer electrolyte having a thickness of 20 μm.

The positive electrode sheet having this coating layer and the above-prepared negative electrode sheet were laminated, and then each of lead terminals was mounted on a positive electrode and a negative electrode. The resulting laminate was placed in a battery container to assemble an electrochemical device shown in FIG. 1.

Property Evaluation of Electrochemical Device

The evaluation of charge and discharge properties of this electrochemical device was performed as follows. After charging in a constant-current/constant-voltage charging mode of a maximum current of 50 mA and a maximum voltage of 4.2 V for 5 hours, the electrochemical device was discharged to 3.0 V at a constant current of 10 mA. The discharge volume was 95.3 mAh. Thereafter, the electrochemical device was recharged in the same condition, and the evaluation of discharge volume was performed under a constant current condition shown in Table 12. The results are shown in Table 11.

Example 34

The present example shows an example of an electrochemical device of the present invention using an all solid-type polymer electrolyte of the present invention. FIG. 1 is a schematic cross-sectional view of this electrochemical device.

Preparation of Positive Electrode Sheet

A mixture of a positive electrode active material and conductive auxiliaries obtained in the same manner as in Example 33, lithium bis(pentafluoroethanesulfonyl)imide {(CF$_3$CF$_2$SO$_2$)$_2$NLi}, propylene carbonate and Polymer F were charged at a weight ratio of 100:20:30:50, and the mixture was heated and kneaded at 150° C.

This kneaded product was extruded into a sheet form at a thickness of 200 μm on an aluminum foil positive electrode collector having a thickness of 15 μm. Thereafter, the collector was dried at 180° C. for 2 hours to obtain a positive electrode sheet.

The content of propylene carbonate contained in this positive electrode sheet was 1,000 ppm or less based on the total weight of the positive electrode sheet excluding an aluminum foil positive electrode collector.

Preparation of Negative Electrode Sheet

Graphite (average particle size: 10 μm) as a negative electrode active material, lithium bis(pentafluoroethanesulfonyl)imide {(CF$_3$CF$_2$SO$_2$)$_2$NLi}, propylene carbonate and Polymer F were charged at a weight ratio of 50:20:30:50, and the mixture was heated and kneaded at 150° C.

This kneaded product was extruded into a sheet form at a thickness of 150 μm on a copper foil negative electrode collector having a thickness of 18 μm. Thereafter, the collector was dried at 180° C. for 2 hours to obtain a negative electrode sheet.

The content of propylene carbonate contained in this negative electrode sheet was 1,000 ppm or less based on the total weight of the negative electrode sheet excluding a copper foil negative electrode collector.

Preparation of Electrochemical Device

Lithium bis(pentafluoroethanesulfonyl)imide {(CF$_3$CF$_2$SO$_2$)$_2$NLi}, propylene carbonate and Polymer F were charged at a weight ratio of 20:30:50, and the mixture was heated and kneaded at 150° C.

This kneaded product was extruded into a sheet form at a thickness of 20 μm on the surface of the above-prepared positive electrode sheet, and then the above-prepared negative electrode sheet was laminated thereon. After this electrode group was dried at 180° C. for 2 hours, an electrochemical device shown in FIG. 1 was assembled.

Property Evaluation of Electrochemical Device

The evaluation of charge and discharge properties of this electrochemical device was performed in the same manner as in Example 33. The results are shown in Table 11.

[Table 11]

TABLE 11

| | Discharge condition (mA) and discharge volume (mAh) | | |
|---|---|---|---|
| | 10 mA | 50 mA | 100 mA |
| Example 33 | 95.3 mAh | 92.7 mAh | 88.3 mAh |
| Example 34 | 89.3 mAh | 86.1 mAh | 83.2 mAh |

TABLE 11-continued

| | Discharge condition (mA) and discharge volume (mAh) | | |
|---|---|---|---|
| | 10 mA | 50 mA | 100 mA |
| Comparative Example 13 | 11.4 mAh | 5.3 mAh | Non-dischargeable |

INDUSTRIAL APPLICABILITY

The polymer electrolyte of the present invention can be used for non-aqueous primary batteries such as a metal lithium battery, aqueous secondary batteries such as an aqueous ion battery, non-aqueous secondary batteries such as a lithium ion secondary battery, non-aqueous electric double layer capacitors, hybrid capacitors and other electrochemical devices.

DESCRIPTION OF REFERENCE NUMERALS

Figure 1:
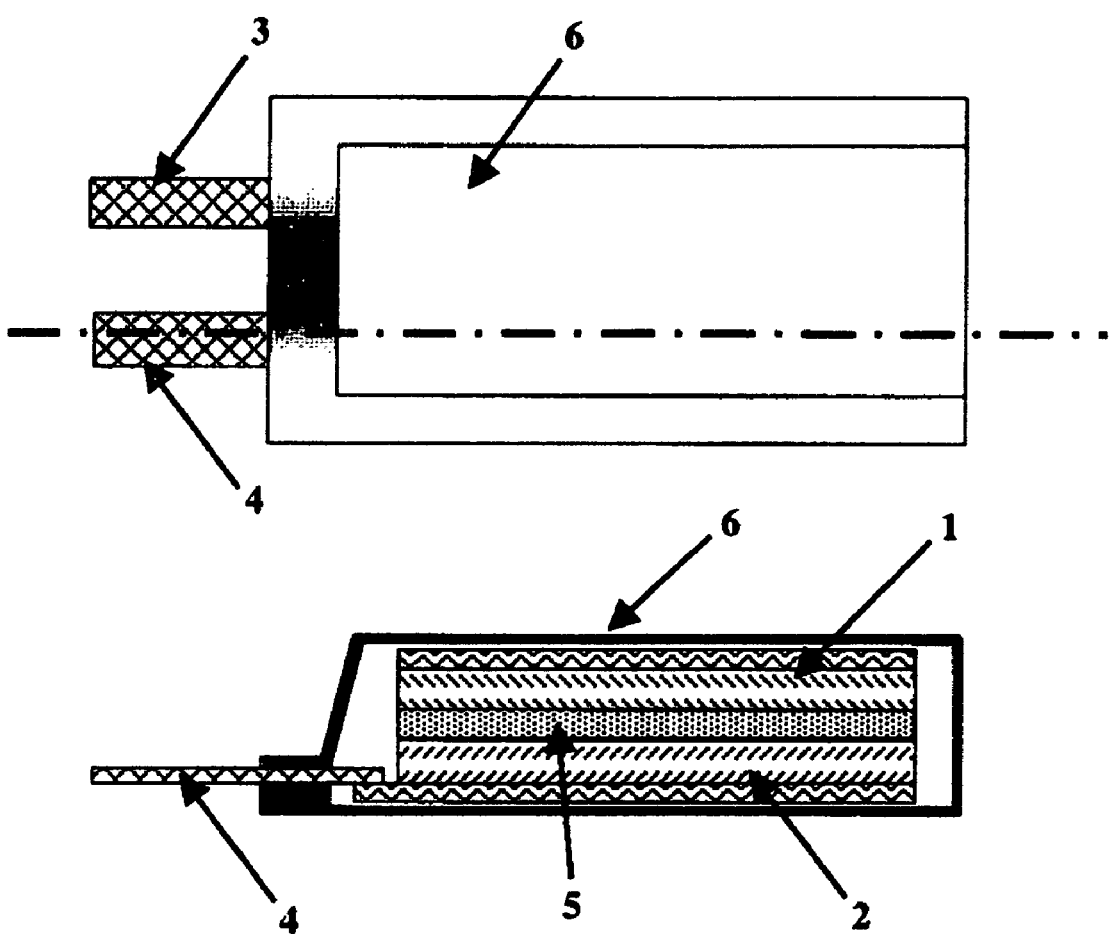
FIG. 1 is a plan view and a longitudinal sectional view showing an example of an electrochemical device of the present invention.

| 1 | Positive electrode |
| 2 | Negative electrode |
| 3 | Positive electrode lead terminal |
| 4 | Negative electrode lead terminal |
| 5 | Polymer electrolyte |
| 6 | Battery container |

The invention claimed is:

1. A polymer electrolyte comprising a polymer material, a solvent and an electrolyte salt, wherein 66.7% by weight to 100% by weight of the polymer material is a copolymer of 50 to 99 mol % of an ethylenically unsaturated compound and 1 to 50 mol % of carbon monoxide.

2. The polymer electrolyte according to claim 1, wherein a weight ratio of the solvent to a total of the solvent and the polymer material is less than 33.3%.

3. The polymer electrolyte according to claim 2, wherein 100% by weight of the polymer material is the copolymer.

4. The polymer electrolyte according to claim 1, wherein the copolymer comprises an alternating copolymer of an ethylenically unsaturated compound and carbon monoxide.

5. The polymer electrolyte according to claim 1, wherein the polymer material is a crosslinked polymer material.

6. A process for producing the polymer electrolyte according to claim 1, comprising the steps of: dissolving a polymer material comprising 66.7% by weight to 100% by weight of a copolymer of 50 to 99 mol % of an ethylenically unsaturated compound and 1 to 50 mol % of carbon monoxide in a solution in which 30% by weight to 90% by weight of an electrolyte salt is dissolved in a solvent; forming the resulting mixture into an arbitrary shape; and removing a part or all of the solvent.

7. The process according to claim 6, wherein 100% by weight of the polymer material is the copolymer.

8. The process according to claim 6, wherein the copolymer comprises an alternating copolymer of an ethylenically unsaturated compound and carbon monoxide.

9. An electrochemical device characterized by using the polymer electrolyte according to claim 1.

10. A polymer electrolyte comprising a polymer material and an electrolyte salt, wherein 66.7% by weight to 100% by weight of the polymer material is a copolymer of 50 to 99 mol % of an ethylenically unsaturated compound and 1 to 50 mol % of carbon monoxide and the polymer material is a crosslinked polymer material.

11. The polymer electrolyte according to claim 10, wherein 100% by weight of the polymer material is the copolymer.

12. The polymer electrolyte according to claim 10, wherein the copolymer comprises an alternating copolymer of an ethylenically unsaturated compound and carbon monoxide.

13. A process for producing a polymer electrolyte which comprises a polymer material and an electrolyte salt, wherein 66.7% by weight to 100% by weight of the polymer material is a copolymer of 50 to 99 mol % of an ethylenically unsaturated compound and 1 to 50 mol % of carbon monoxide, comprising the steps of: dissolving a polymer material comprising 66.7% by weight to 100% by weight of a copolymer of 50 to 99 mol % of an ethylenically unsaturated compound and 1 to 50 mol % of carbon monoxide in a solution in which 30% by weight to 90% by weight of an electrolyte salt is dissolved in a solvent; forming the resulting mixture into an arbitrary shape; and removing a part or all of the solvent.

14. The process according to claim 13, wherein 100% by weight of the polymer material is the copolymer.

15. The process according to claim 13, wherein the copolymer comprises an alternating copolymer of an ethylenically unsaturated compound and carbon monoxide.

16. An electrochemical device characterized by using a polymer electrolyte, wherein the polymer electrolyte comprises a polymer material and an electrolyte salt, wherein 66.7% by weight to 100% by weight of the polymer material is a copolymer of 50 to 99 mol % of an ethylenically unsaturated compound and 1 to 50 mol % of carbon monoxide.

17. The electrochemical device according to claim 16, wherein 100% by weight of the polymer material is the copolymer.

18. The electrochemical device according to claim 16, wherein the copolymer comprises an alternating copolymer of an ethylenically unsaturated compound and carbon monoxide.

* * * * *